US008233896B2

United States Patent
Wehling (10) Patent No.: US 8,233,896 B2
(45) Date of Patent: Jul. 31, 2012

(54) MOBILE COMMUNICATION UNITS THAT DISPLAY CONNECTIVITY LOSS BOUNDARIES

(75) Inventor: John H. Wehling, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 475 days.

(21) Appl. No.: 12/488,838

(22) Filed: Jun. 22, 2009

(65) Prior Publication Data

US 2010/0323659 A1    Dec. 23, 2010

(51) Int. Cl.
*H04M 11/00*    (2006.01)

(52) U.S. Cl. .............. 455/421; 455/422.1; 455/423; 455/456.1; 455/457

(58) Field of Classification Search ............... 455/421, 455/456.1, 404.1, 404.2, 440, 457; 370/328, 370/338
See application file for complete search history.

(56) References Cited

U.S. PATENT DOCUMENTS

| | | | | |
|---|---|---|---|---|
| 5,848,373 | A  * | 12/1998 | DeLorme et al. .............. 701/200 |
| 6,525,690 | B2 * | 2/2003 | Rudow et al. ............... 342/357.4 |
| 7,085,571 | B2 * | 8/2006 | Kalhan et al. ................. 455/440 |
| 7,268,700 | B1 * | 9/2007 | Hoffberg ...................... 340/905 |
| 2001/0041565 | A1 * | 11/2001 | Vicharelli et al. ............. 455/423 |
| 2002/0142788 | A1 * | 10/2002 | Chawla et al. ................ 455/504 |
| 2004/0048620 | A1 * | 3/2004 | Nakahara et al. .......... 455/456.1 |
| 2005/0171653 | A1 * | 8/2005 | Taylor .............................. 701/13 |
| 2006/0061469 | A1 * | 3/2006 | Jaeger et al. ............. 340/539.13 |
| 2007/0142091 | A1 * | 6/2007 | Gasborro et al. ............. 455/566 |
| 2008/0010010 | A1 * | 1/2008 | Le ................................. 701/208 |
| 2008/0125106 | A1 * | 5/2008 | Lee et al. ...................... 455/421 |
| 2008/0125964 | A1 * | 5/2008 | Carani et al. ................. 701/207 |
| 2008/0132252 | A1 * | 6/2008 | Altman et al. ................ 455/457 |
| 2008/0228393 | A1 * | 9/2008 | Geelen et al. ................ 701/208 |
| 2009/0011777 | A1 * | 1/2009 | Grunebach et al. ........ 455/456.3 |
| 2009/0036148 | A1 * | 2/2009 | Yach ............................. 455/457 |
| 2009/0088180 | A1 * | 4/2009 | LaMance et al. .......... 455/456.1 |
| 2009/0286526 | A1 * | 11/2009 | Matsunaga ................... 455/421 |
| 2010/0022255 | A1 * | 1/2010 | Singhal ........................ 455/457 |

* cited by examiner

*Primary Examiner* — Ajit Patel
*Assistant Examiner* — Magdi Elhag
(74) *Attorney, Agent, or Firm* — Tarolli, Sundheim, Covell & Tummino LLP (57) ABSTRACT

A mobile communication unit is provided that employs a propagation algorithm to determine connectivity loss boundaries that define connectivity loss regions based on one or more forward projected position vector paths of the mobile communication unit and connectivity data. The mobile communication unit further comprises a map renderer configured to provide map display data that includes the map area data, situational awareness location data and the determined connectivity loss boundaries, and a display configured to display the map display data as a geographical map area with an icon of the mobile communication unit located in a geographic location of the geographical map area and drawn connectivity loss boundaries that define connectivity loss regions in a geographic location of the geographical map area.

27 Claims, 5 Drawing Sheets

MOBILE COMMUNICATION UNITS THAT DISPLAY CONNECTIVITY LOSS BOUNDARIES

TECHNICAL FIELD

The present invention relates generally to communications, and specifically to mobile communication units that display connectivity loss boundaries.

BACKGROUND

The use of communication systems having wireless mobile communication units (MCUs) has become widespread. Wireless communication systems that operate within a cell or coverage area provide several important advantages over conventional wired systems. For example, wireless communication users can communicate in locations where wired service is not available or feasible, such as remote or rugged locations. Additionally, wireless communication users within the cell have much more mobility because the units do not have to be connected to a fixed wired network. These and other favorable characteristics make wireless communications ideally suited for personal, business, military, search and rescue, law enforcement, water vehicle, and other field related applications.

In some applications, it is desirable to maintain consistent periodic communication with one or more other MCUs. Such consistent communications are useful in situations that have a risk of incapacitation of the user, such as battlefield applications, recreational activities in rugged environments, or civilian search and rescue operations. If the periodic communications from the user cease, a search can be carried out at the last reported location. A variation on this theme could include an automated communications unit that periodically broadcasts a signal to other communication units, such that the signal itself can be employed to locate the user.

If an area is equipped with robust communications infrastructures (e.g., cell towers), there are relatively easy ways to establish and maintain such wireless communications to mobile users, by making use of the infrastructure. However, there are some endeavors, such as search and rescue and/or military applications, where it is necessary to provide such a wireless communications capability even in an area that does not have such a communications infrastructure, and in such cases it is much more difficult to establish and maintain such wireless communications to mobile users.

Mobile users can experience rapid variations in connectivity between node pairs (e.g., MCU to MCU, MCU to cell tower). Connectivity variations are primarily due to propagation loss variations. An individual connection suddenly breaks or reforms respectively as the signal-to noise drops below or rises above a connectivity threshold. Propagation loss and signal-to-noise ratio can vary quickly, particularly for fast moving nodes in complex terrain or in urban areas. Due to the complex relationship between terrain and propagation loss, it is difficult for individual mobile users to anticipate connectivity breaks. Thus, a mobile user may suddenly find his node disconnected from the network with little or no warning. Also, a disconnected mobile user may not know where to relocate to restore a network connection.

SUMMARY

In one aspect of the invention, a mobile communication unit is provided. The mobile communication unit comprises a transceiver configured to send and receive wireless communications to and from other nodes in a network, a global position system (GPS) device configured to determine a situational awareness (SA) location and/or velocity of the mobile communication unit and a propagation analyzer that employs a propagation algorithm to determine connectivity loss boundaries that define connectivity loss regions based on one or more forward projected position vector paths of the mobile communication unit and connectivity data. The mobile communication unit further comprises a map renderer configured to provide map display data that includes the map area and terrain data, the SA location and/or velocity and the determined connectivity loss boundaries, and a display configured to display the map display data as a geographical map area with an icon of the mobile communication unit located in a geographic location of the geographical map area and drawn connectivity loss boundaries that define connectivity loss regions in a geographic location of the geographical map area.

In another aspect of the invention, a mobile communication unit is provided. The mobile communication unit comprises a transceiver configured to send and receive wireless communications to and from other nodes in a network, a global position system (GPS) device configured to determine a situational awareness (SA) location and/or velocity of the mobile communication unit and a memory that stores computer executable instructions, map area and terrain data and the SA location and/or velocity data of the mobile communication unit. The mobile communication unit further comprises a processor that executes the computer executable instructions comprising a propagation algorithm to determine connectivity loss boundaries that define connectivity loss regions based on one or more forward projected position vector paths of the mobile communication unit, connectivity data comprises radio performance data associated with performance of the mobile communication unit and/or performance of other nodes of the network and propagation loss data based on expected or actual environment of the actual area associated with the map area and terrain data comprising contour data, foliage, street and building location data within the actual geographical area associated with the map area data and the computer executable instructions further comprising a map renderer configured to provide map display data that includes the map area and terrain data, the SA location data and/or velocity and the determined connectivity loss boundaries. The mobile communication unit further comprises a display configured to display the map display data as a geographical map area with an icon of the mobile communication unit located in a geographic location of the geographical map area and drawn connectivity loss boundaries that define connectivity loss regions in a geographic location of the geographical map area.

In yet another aspect of the invention, a method provides a connectivity loss warning for a mobile communication unit communicatively coupled to a network. The method comprises determining a situation awareness (SA) location and/or velocity of the mobile communication unit, receiving connectivity data comprising radio performance data associated with performance of the mobile communication unit and/or performance of other nodes of the network and propagation loss data based on expected or actual environment of the actual area associated with the SA location of the mobile communication unit and executing a propagation algorithm to determine connectivity loss boundaries that define connectivity loss regions based on the connectivity data and one or more forward projected position vector paths from the SA location and/or velocity of the mobile communication unit to determine connectivity loss boundaries. The method further comprises displaying a geographical map area with an icon of the mobile communication unit located in a geographic location of the geographical map area based on the SA location and/or velocity data and drawn connectivity loss boundaries that define connectivity loss regions in a geographic location of the geographic map area.

DETAILED DESCRIPTION

The present invention relates generally to communications, and specifically to mobile communication units that provide a connectivity loss warning function by displaying connectivity loss boundaries that define connectivity loss regions. The connectivity loss warning function (e.g., blackout function) can be employed by each node in a mobile ad hoc radio network. Alternatively, the connectively loss warning function can be employed in a mobile communication unit of a cellular network or a separate unit (e.g., GPS navigation system) coupled to the mobile communication unit. Vehicle drivers and/or radio operators can be warned of potential connectivity loss regions. The warning can be provided on a look-down map display showing the geographical location of the vehicle or mobile communication unit and boundaries of connectivity loss regions in a geographical map area.

In one aspect of the invention, dynamic position and velocity information (called situational awareness (SA) information) is employed to determine the location of connection to the network (e.g., other nodes, cell towers). The network can provide periodic updates of SA data for all nodes. Individual nodes keep track of their own position/velocity via GPS or other means. Thus, each node equipped with the connectivity loss warning function knows the SA of all or at least some of the other network nodes.

Figure 1:
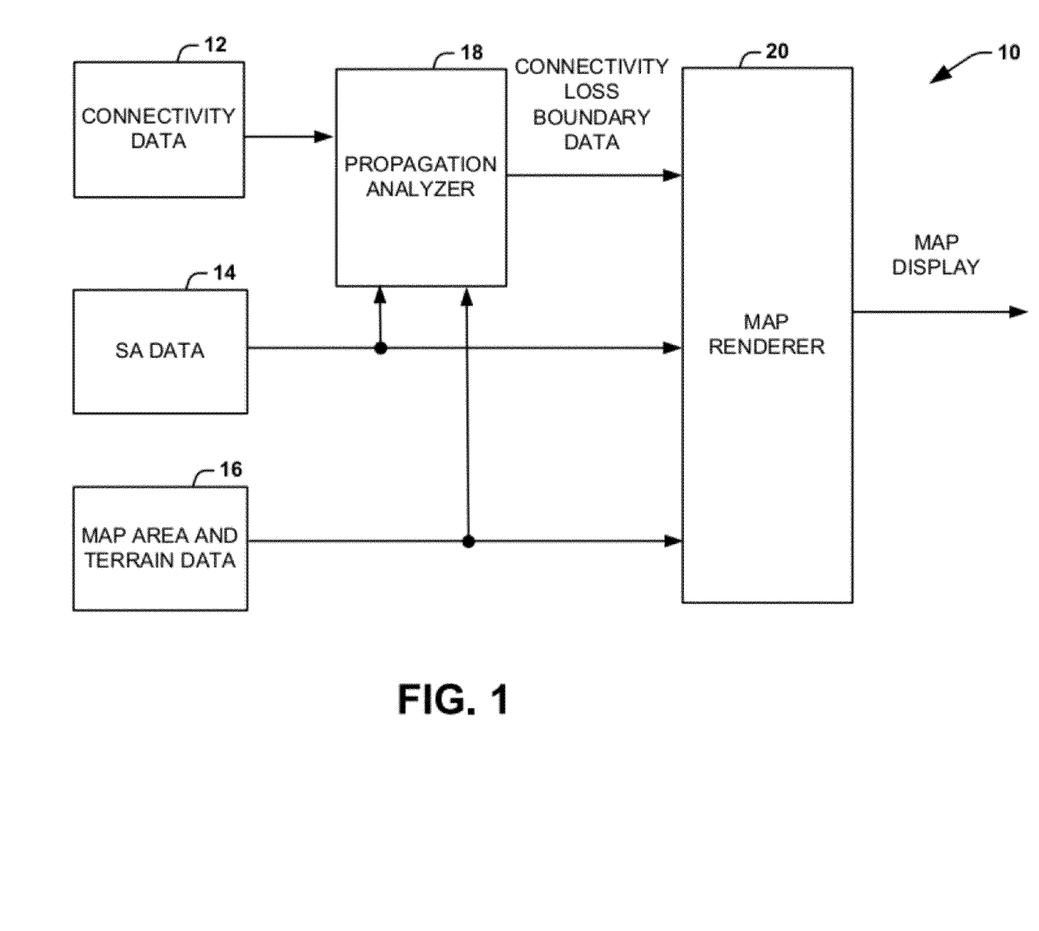
FIG. 1 illustrates components of a connectivity loss warning function of a mobile communication unit in accordance with an aspect of the invention.

FIG. 1 illustrates components of a connectivity loss warning function 10 of a mobile communication unit in accordance with an aspect of the invention. The connectively loss warning function 10 employs a propagation analyzer 18. The propagation analyzer can be a controller, a processor and/or computer executable instructions that execute on the controller or processor. The propagation analyzer 18 employs a propagation algorithm (e.g., forward propagation algorithm) that is based on a connectivity model. The connectivity model is based on performing signal-to-noise ratio analysis on node pairs at known locations to determine connectivity loss boundaries. The connectivity model is based on one or more of the following models: a radio performance model (power, antenna gain, modulation, data rate, error detection, error correction, encryption, etc.), a propagation loss model based on the physics of radio propagation (e.g., space loss, air/ weather absorption, diffraction, refraction, and ground wave attenuation), a terrain contour model, and a foliage and building overlay to terrain contour model.

The radio performance model and the propagation loss model is based on employing connectivity data 12 provided by a respective mobile communication unit and/or the network. The connectivity data 12 provides radio performance data associated with the respective mobile communication unit and/or other nodes of which the mobile communication unit communicates. The connectivity data 12 can also provide propagation loss data that can be provided by the mobile communication unit or the network based on the expected or actual environment which the mobile communication unit is operating. The terrain contour model and the foliage and building overlay to terrain contour model can be based on employing map area and terrain data 16 provided by a respective mobile communication and/or the network. The map area and terrain data 16 provides map area data which can be a geographical map area of an actual geographical area (e.g., a still picture of a geographical area, a real-time picture of a geographical area) in which the mobile communication unit is operating. The map area and terrain data can also include foliage, street and building location data and terrain contour data based on, for example, an elevation map of the area in which the mobile communication unit is operating.

The propagation analyzer 18 also receives SA data 14 which includes data associated with the location and velocity of the mobile communication unit. In a cellular system, the SA data can include locations of fixed cell towers and/or location and velocity of other mobile communication units which the mobile communication unit is in communication with. In a mobile network, the SA data can include locations and velocities of other mobile communication units of the mobile network in which the mobile communication unit is in communication with. The location and velocity of the mobile communication unit can be provided by a global positioning satellite (GPS) device that is part of the mobile communication unit. The SA data of cellular towers and/or other mobile nodes of the network can be provided through the other nodes of the network, or a separate base station located on a moving vehicle, such as a ground vehicle, air vehicle or satellite.

The propagation analyzer 18 employs the connectivity data 12, the SA data 14 and map area and terrain data 16 to provide connectivity loss boundary data to a map renderer 20. The map renderer 20 can be a controller, a processor and/or computer executable instructions that execute on the controller or processor. The propagation analyzer 18 can employ position/ velocity data for each node in a network to predict future physical network topology. A "look forward" algorithm can be employed to project the position vector path forward in time for other nodes of the network. Forward projection will be based on the velocity vector and possibly the terrain contour and/or road overlay data. The other nodes can be other mobile communication units for an adhoc mobile network and would also be moving along with the user's mobile communication unit. The other nodes could be cellular towers for a cellular system and would be fixed relative to a user's moving mobile communication unit.

The propagation analyzer 18 can also project the user's mobile communication unit's own forward projected position vector path. The self projection can consider multiple options for future mobility. For each mobility option, connectivity can be computed versus future time between self and other nodes. If some mobility options result in connectivity loss, the connectivity loss will be determined in the form of connectivity loss boundary data and displayed on a map display as a connectivity loss boundary that defines a connectivity loss region. The map renderer 20 also receives map area and terrain data 16 which can be provided to the map display and the SA data 14 which can allow the map renderer 20 to map the geographical location of other nodes of the network or cellular towers and the mobile communication unit onto a geographical map area to a map display.

Figure 2:
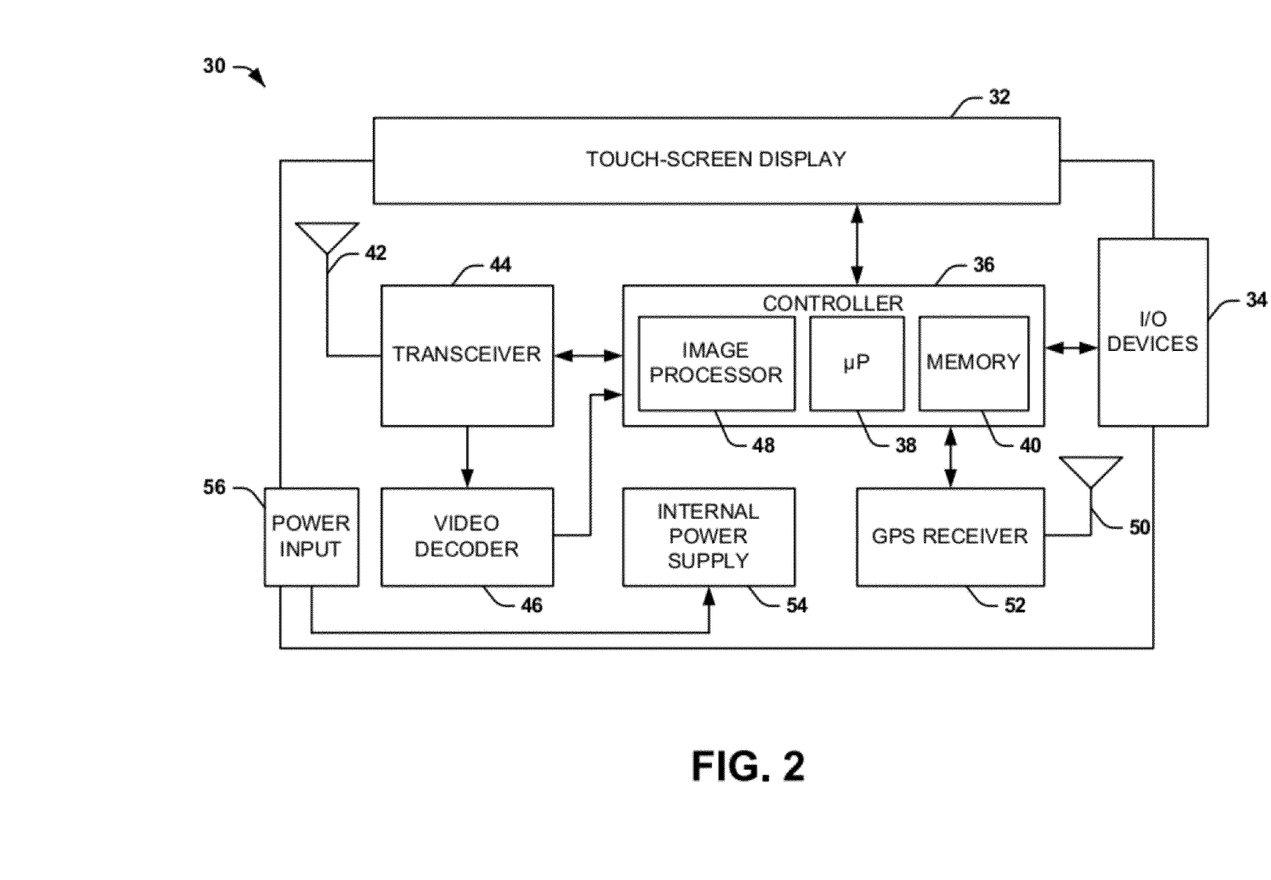
FIG. 2 illustrates an example of a block diagram of a mobile communication unit in accordance with an aspect of the invention.

FIG. 2 illustrates a mobile communication unit 30 in accordance with an aspect of the invention. The mobile computer unit 30 includes a touch-screen display 32. The touch-screen display 32 can display video data, and could also be configured to receive touch inputs from a user, such as from a finger or a stylus. It is to be appreciated that the mobile communication unit could employ a keyboard and a non-touch-screen display. The mobile communication unit 30 also includes input/output (I/O) devices 34, such as pushbuttons and LED indicators. The I/O devices 34 could be more important and/or frequently accessed functionality that can be moved off the touch-screen display 32 to conserve valuable screen space. As an example, the I/O devices 34 could include a power button, a mode select button, a volume button, and/or a battery life indicator.

Both the touch-screen display 32 and the I/O devices 34 are coupled to a controller 36. The controller 36 includes a microcontroller/microprocessor 38 (labeled as μP) and a memory 40. The user can input data into the mobile communication unit 30 via the touch screen display 32 and/or the I/O devices 34. The data can be processed by the microcontroller/microprocessor 38 and/or stored in the memory 40. In addition, data can be retrieved from the memory 40 and displayed on the touch-screen display 32. The memory can also store computer executable instructions that includes the propagation analyzer 18 and the map renderer 20 of FIG. 1. The memory 36 can also stored SA data 14 received from a GPS receiver 52 and other nodes of a network in which the mobile communication unit 30 is operating and map and terrain data 16 in which the mobile communication unit 30 is operating.

The mobile communication unit 30 can act as a wireless communications device. The mobile communication unit 30 includes an antenna 42 coupled to a transceiver 44. The antenna 42 is capable of transmitting and receiving high-frequency wireless signals that are modulated and demodulated by the transceiver 44, such that the mobile communication unit 30 can transmit and receive voice, video, and/or information data to and from other mobile communication units, a wireless router, and/or a host computer. As an example, the mobile communication unit 30 can wirelessly transmit and receive data using IEEE 802.11 (i.e., WiFi), IEEE 802.15 (i.e., Bluetooth), or MeshNetwork communication standards. In the example of the use of a Bluetooth communications standard, the mobile communication unit 30 may be capable of being bonded with another Bluetooth device. The transceiver 44 is coupled to the controller 36, such that transmitted and received data can be processed by the microcontroller/microprocessor 38 and/or stored in the memory 40.

The transceiver 44 is also coupled to a video decoder 46. The video decoder 46 is capable of decoding, for example, National Television System Committee (NTSC) encoded video images in either a composite or S-video format. The video decoder 46 is coupled to the controller 36, which also includes an image processor 48. The image processor 48 is configured to process the video data and display the video data on the touch-screen display 32. As an example, the video data could include a real-time map image of a geographical area that includes the user of the mobile communication unit 30 and other external nodes of the network. It is to be understood that the mobile communication unit 30 is not limited to just receiving video data, but that video data could be generated, for example, from a plug-in peripheral device and transmitted from the mobile communication unit 30 to other mobile computer communication units, a wireless router, and/or a host computer.

The mobile communication unit 30 also includes a global positioning satellite (GPS) antenna 50 and the GPS receiver 52. The GPS antenna 50 is configured to receive a GPS location signal from a GPS satellite system, the GPS location signal being configured to communicate location information to the user of the mobile communication unit 30. The GPS receiver 52 interprets the location information and transfers the interpreted location information to the controller 36. A user of the mobile communication unit 30 can transmit situational awareness (SA) data that includes the location data and velocity to other mobile communication units, a wireless router, and/or a host computer.

The mobile communication unit 30 further includes an internal power supply 54. The internal power supply 54 could be, for example, a rechargeable battery, such as a lithium ion battery. The internal power supply 54 is coupled to a power input 56, such that an external power supply (e.g., a DC power adaptor) could be plugged into the power input 56. The external power supply could thus supply power to the mobile communication unit 30 while it is plugged into the power input 56, allowing the mobile communication unit 30 to operate from the external power supply while the internal power supply 54 recharges.

It is to be understood that the mobile communication unit 30 is not intended to be limited by the example of FIG. 2. Many components necessary for operation of the mobile communication unit 30, as well as much functionality associated with the illustrated components, have been omitted for the sake of simplicity of explanation. Additionally, in accordance with an aspect of the invention, the mobile communication unit 30 could also include additional components, such as, for example, connection ports to peripheral devices, as may be deemed necessary for certain applications.

Figure 3:
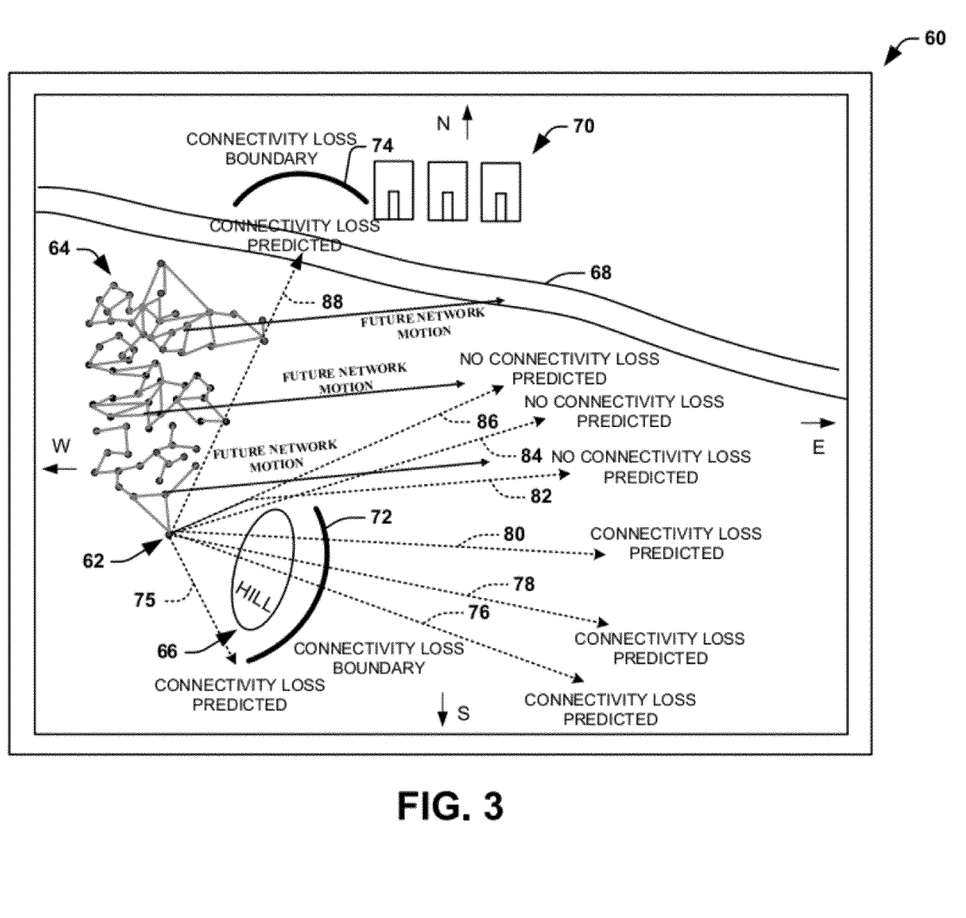
FIG. 3 illustrates a map display of a mobile communication unit associated with a mobile network in accordance with an aspect of the present invention.

FIG. 3 illustrates a map display 60 of a mobile communication unit 62 associated with a mobile network 64 in accordance with an aspect of the present invention. As illustrated a geographical map area in which the mobile communication unit is operating is displayed on the map display 60 and a location of the mobile communication unit 62 is displayed as an icon within the map display 60 adjacent other nodes of a mobile network 64. The map display 60 illustrates a hill 66 in a forward path (e.g., eastern path) of the mobile communication unit 62, a road 68 that is displayed north of the mobile communication unit 62 and a set of buildings 70 north of the road 68. The SA data of the mobile communication unit 62 and the other nodes of the mobile network 64 is employed to project the forward projected position vector path(s) of the other nodes of the mobile network 64 and a plurality of forward projected position vector paths of the mobile communication unit 62. Each node of the network 64 can receive SA data of other nodes of the network 64 from either a connecting node (e.g., via a router) or a base station that can be reside in a mobile ground vehicle, an air vehicle or a satellite. The mobile communication unit 62 employs connectivity data, map area and terrain data, the network forward projected position vector path and each given forward projected position vector path of the mobile communication unit 62 to compute connectivity of the mobile communication unit 62 to the network 64 versus future time at each of the plurality of forward projected position vector paths. If some mobility options result in connectivity loss, the connectivity loss will be determined in the form of connectivity loss boundary data and displayed as a drawn connectivity loss boundary that defines a coverage loss region.

As illustrated in FIG. 3, if the mobile communication unit 62 follows forward projected position vector path 75 behind the hill 66 or forward projected position vector paths 76, 78 or 80 over the hill 66, a connectivity loss is predicted, such that a connectivity loss region is determined and drawn as a connectivity loss boundary 72 for the mobile communication unit 62. If the mobile communication unit 62 follows forward projected position vector paths 82, 84 or 86 along the predicted future network motion, no connectivity loss is predicted. If the mobile communication unit 62 follows forward projected position vector path 88 that runs alongside the buildings 70 a connectivity loss is predicted, such that a connectivity loss region is determined and drawn as a connectivity loss boundary 74 for the mobile communication unit.

Figure 4:
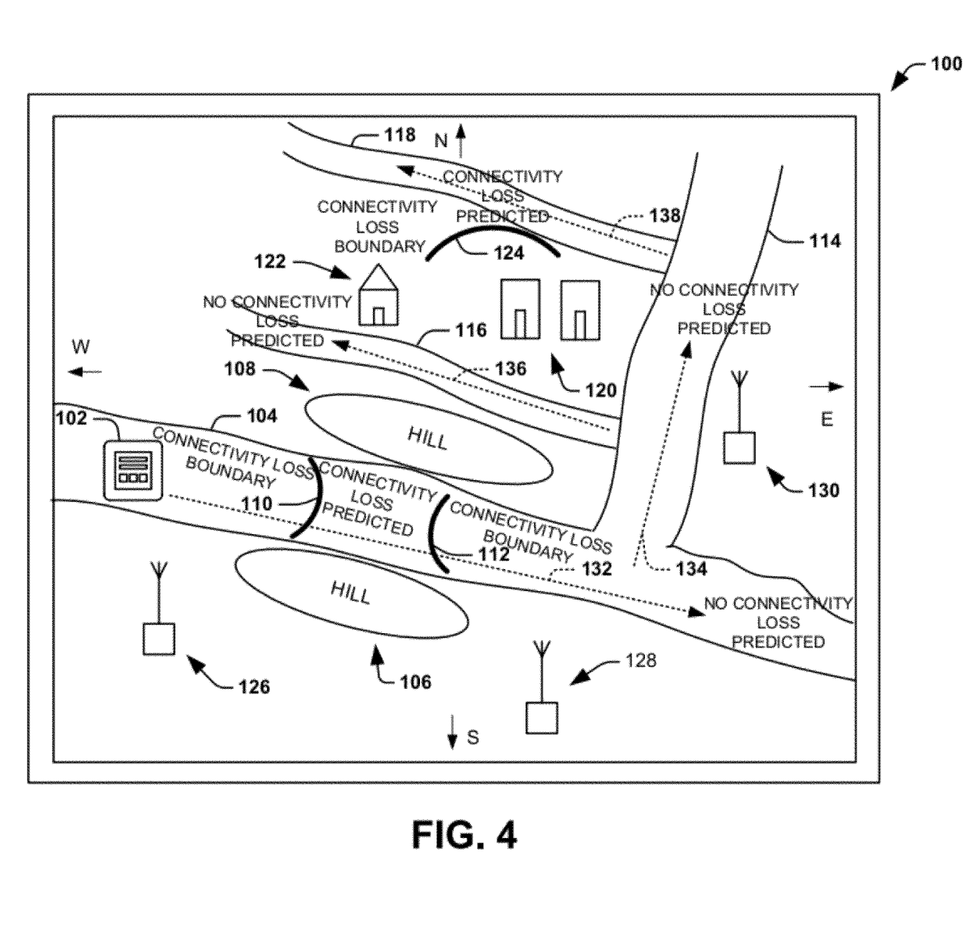
FIG. 4 illustrates a map display of a mobile communication unit associated with a cellular network in accordance with an aspect of the present invention.

FIG. 4 illustrates a map display 100 of a mobile communication unit 102 associated with a cellular network in accordance with an aspect of the present invention. As illustrated a geographical map area in which the mobile communication unit is operating is displayed in the map display and illustrating a geographical location of the mobile communication unit 102 is displayed as an icon within the map display 100. The map display 100 illustrates a first road 104 in a forward path (e.g., eastern path) of the mobile communication unit 102 with a first hill 106 and a second hill 108 adjacent each side of the first road 104. A second road 114 is displayed running north and perpendicular of the first road 104. A third road 116 runs west and perpendicular to the second road 114 and a fourth road 118 runs west and perpendicular to the second road 116 and north of the third road 116. A pair of buildings 120 and a house 122 reside in between the third road 116 and the fourth road 118. A first cell tower 126 resides south of the mobile communication unit 102 and the first road 104 and a second cell tower 128 resides south of the first road on the opposite side of the first hill 106. A third cell tower 130 resides north of the first road 104 and east of the second road 114.

As illustrated in FIG. 4, the mobile communication unit 102 is heading east along the first road 104 aligned with a first forward projected position vector path 132 in which is illustrated a first connectivity loss boundary 110 and a second connectivity loss boundary 132 on the first road 104 between the first and second hills 106 and 108. This is likely caused by the blocking of signals from the first and second cell tower 126 and 128 by the first hill 106. If the mobile communication unit 102 continues following the first forward projected position vector path 132 along the first road 104, no further connectivity loss is predicted. If the mobile communication unit 102 follows a second forward projected position vector path 134 along the second road 114, no connectivity loss is predicted. If the mobile communication unit 102 follows a third forward projected position vector path 136 along the third road 136, no connectivity loss is predicted. However, if the mobile communication unit 102 follows a fourth forward projected position vector path 118 along the fourth road 118, a third connectivity loss boundary 124 is determined likely caused by the blocking of signals of one or more of the first, second and third cell towers 126, 128 and 130 by the second hill 108, the pair of buildings 120, the house 122 and/or the distance from the first, second and third cell towers 126, 128 and 130.

The SA data of the mobile communication unit 102 and the first, second and third cell towers 126, 128 and 130 is employed to project the forward projected position vector paths of the mobile communication unit 102. The mobile communication unit 102 employs the connectivity data, map area and terrain data, the cell tower position data and each given forward projected position vector path of the mobile communication unit 102 to compute connectivity of the mobile communication unit 102 to the network versus future time at each of the plurality of forward projected position vector paths. If some mobility options result in connectivity loss, the coverage loss connectivity will be determined in the form of connectivity loss boundary data and displayed as a connectivity loss boundary as illustrated in FIG. 4.

Figure 5:
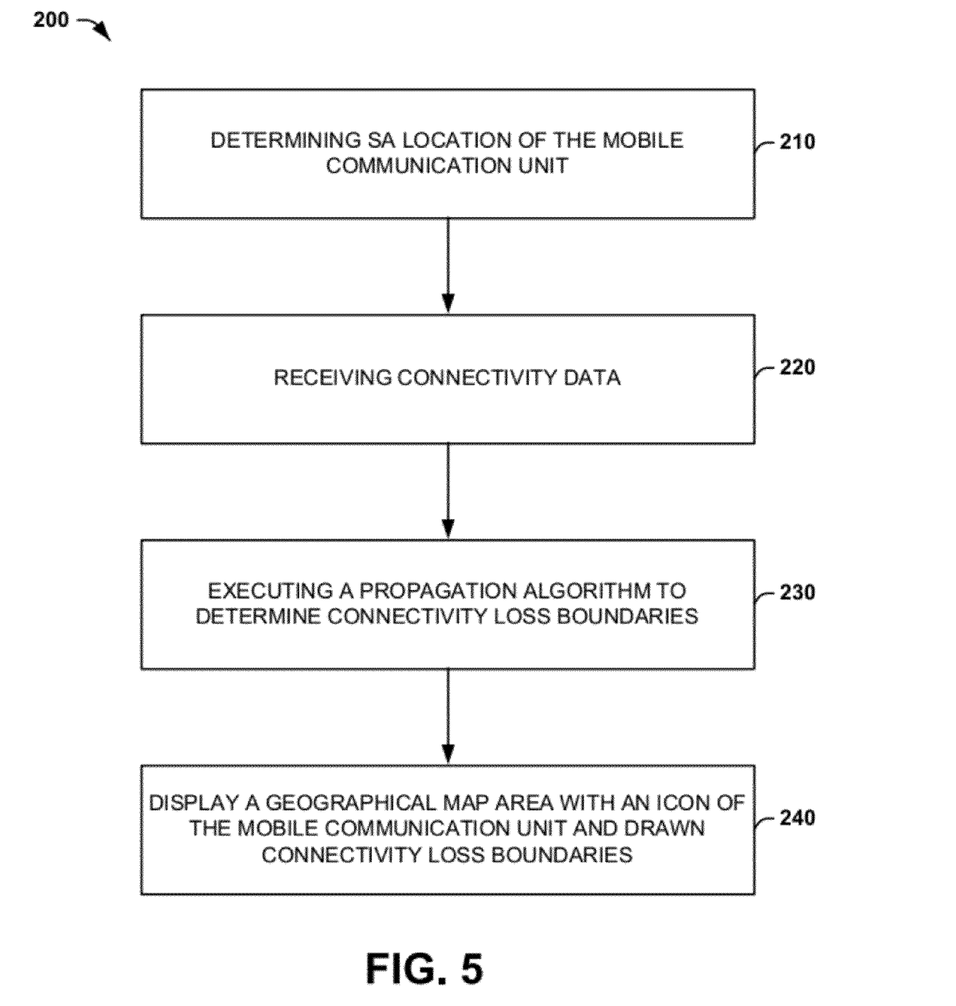
FIG. 5 illustrates a method for providing a connectivity loss warning for a mobile communication unit communicatively coupled to a network.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 5 illustrates a method 200 for providing a connectivity loss warning for a mobile communication unit communicatively coupled to a network. The method begins at 210 where a situational awareness (SA) location of the mobile communication unit is determined. At 220, connectivity data is received comprising radio performance data associated with performance of the mobile communication unit and/or performance of other nodes of the network and propagation loss data based on expected or actual environment of the actual area associated with the SA location of the mobile communication unit. At 230, a propagation algorithm is executed to determine connectivity loss boundaries that define connectivity loss regions based on the connectivity data and one or more forward projected position vector paths from the SA location of the mobile communication unit to determine connectivity loss boundaries. At 240, a geographical map area is displayed with an icon of the mobile communication unit located in a geographic location of the geographical map area based on the SA location data and drawn connectivity loss boundaries that define connectivity loss regions in a geographic location of the geographic map area.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A mobile communication unit comprising:
   a transceiver configured to send and receive wireless communications to and from other nodes in a network;
   a global position system (GPS) device configured to determine a situation awareness (SA) location and/or velocity of the mobile communication unit;
   a propagation analyzer that employs a propagation algorithm to determine connectivity loss boundaries that define connectivity loss regions based on one or more forward projected position vector paths of the mobile communication unit and connectivity data;

a map renderer configured to provide map display data that includes map area and terrain data, the SA location and/or velocity data and the determined connectivity loss boundaries; and a display configured to display the map display data as a geographical map area with an icon of the mobile communication unit located in a geographic location of the geographical map area and drawn connectivity loss boundaries that define connectivity loss regions in a geographic location of the geographical map area.

2. The mobile communication unit of claim 1, wherein the connectivity data comprises radio performance data associated with performance of the mobile communication unit and/or performance of other nodes of the network and propagation loss data based on an expected or an actual environment of the actual area associated with the geographical map area.

3. The mobile communication unit of claim 1, wherein the propagation analyzer further employs terrain data of the map area data to determine the connectivity loss boundaries.

4. The mobile communication unit of claim 3, wherein the terrain data comprises terrain contour data, foliage, street and building location data within the actual geographical area associated with the geographical map area.

5. The mobile communication unit of claim 1, wherein the network is a mobile network and the propagation analyzer further employs SA data of the mobile network to determine the connectivity loss boundaries.

6. The mobile communication unit of claim 5, wherein the SA data of the mobile network comprises the geographic locations of a plurality of other mobile communication units of the mobile network.

7. The mobile communication unit of claim 1, wherein the network is a cellular network and the propagation analyzer further employs SA data of cellular towers of the cellular network to determine the connectivity loss boundaries.

8. The mobile communication unit of claim 1, wherein the propagation algorithm is based on a connectivity model that performs signal-to-noise ratio analysis on node pairs at known locations in the network to determine connectivity loss boundaries.

9. The mobile communication unit of claim 8, wherein the connectivity model is based on a radio performance model and a propagation loss model.

10. The mobile communication unit of claim 8, wherein the connectivity model is based on a terrain contour model and a foliage and building overlay to terrain contour model.

11. A mobile communication unit comprising:
a transceiver configured to send and receive wireless communications to and from other nodes in a network;
a global position system (GPS) device configured to determine a situation awareness (SA) location and/or velocity of the mobile communication unit;
a memory that stores computer executable instructions, map area and terrain data and the SA location and/or velocity data of the mobile communication unit;
a processor that executes the computer executable instructions comprising a propagation algorithm to determine connectivity loss boundaries that define connectivity loss regions based on one or more forward projected position vector paths of the mobile communication unit, connectivity data comprises radio performance data associated with performance of the mobile communication unit and/or performance of other nodes of the network and propagation loss data based on expected or actual environment of the actual area associated with the map area and terrain data comprising contour data, foliage, street and building location data within the actual geographical area associated with the map area data and the computer executable instructions further comprising a map renderer configured to provide map display data that includes the map area and terrain data, the SA location and/or velocity data and the determined connectivity loss boundaries; and a display configured to display the map display data as a geographical map area with an icon of the mobile communication unit located in a geographic location of the geographical map area and drawn connectivity loss boundaries that define connectivity loss regions in a geographic location of the geographical map area.

12. The mobile communication unit of claim 11, wherein the network is a mobile network and the propagation algorithm further employs SA data of the mobile network to determine the connectivity loss boundaries.

13. The mobile communication unit of claim 12, wherein the SA data of the mobile network comprises the geographic locations of a plurality of other mobile communication units of the mobile network.

14. The mobile communication unit of claim 11, wherein the network is a cellular network and the propagation algorithm further employs SA data of cellular towers of the cellular network to determine the connectivity loss boundaries.

15. The mobile communication unit of claim 11, wherein the propagation algorithm is based on a connectivity model that performs signal-to-noise ratio analysis on node pairs at known locations in the network to determine connectivity loss boundaries.

16. The mobile communication unit of claim 11, wherein the connectivity model is based on a radio performance model, a propagation loss model, a terrain contour model and a foliage and building overlay to terrain contour model.

17. A method for providing a connectivity loss warning for a mobile communication unit communicatively coupled to a network, the method comprising:
determining a situation awareness (SA) location and/or velocity of the mobile communication unit;
receiving connectivity data comprising radio performance data associated with performance of the mobile communication unit and/or performance of other nodes of the network and propagation loss data based on expected or actual environment of the actual area associated with the SA location and/or velocity data of the mobile communication unit;
executing a propagation algorithm to determine connectivity loss boundaries that define connectivity loss regions based on the connectivity data and one or more forward projected position vector paths from the SA location and/or velocity data of the mobile communication unit to determine connectivity loss boundaries; and
displaying a geographical map area with an icon of the mobile communication unit located in a geographic location of the geographical map area based on the SA location and/or velocity data and drawn connectivity loss boundaries that define connectivity loss regions in a geographic location of the geographic map area.

18. The method of claim 17, wherein the propagation algorithm further employs terrain data of the map area data to determine the connectivity loss boundaries, the terrain data comprises terrain contour data, foliage, street and building location data within the actual area associated with the geographical map area.

19. The method of claim 17, wherein the network is a mobile network and the propagation algorithm further employs SA data of the mobile network to determine the connectivity loss boundaries, the SA data of the mobile network comprises the geographic locations of a plurality of other mobile communication units of the mobile network.

20. The method of claim 17, wherein the network is a cellular network and the propagation algorithm further employs SA data of cellular towers of the cellular network to determine the connectivity loss boundaries.

21. The method of claim 17, wherein the propagation algorithm is based on a connectivity model that performs signal-to-noise ratio analysis on node pairs at known locations in the network to determine connectivity loss boundaries.

22. The mobile communication unit of claim 1, wherein the propagation analyzer concurrently determines connectivity loss boundaries that define connectivity loss regions for each of a plurality of forward projected position vector path options of the mobile communication unit, and wherein the map renderer is configured to provide the map display data including the determined connectivity loss boundaries for each of the plurality of forward projected position vector path options to the display.

23. The mobile communication unit of claim 11, wherein the propagation analyzer concurrently determines connectivity loss boundaries that define connectivity loss regions for each of a plurality of forward projected position vector path options of the mobile communication unit, and wherein the map renderer is configured to provide the map display data including the determined connectivity loss boundaries for each of the plurality of forward projected position vector path options to the display.

24. The method of claim 17, wherein executing the propagation algorithm comprises concurrently determining connectivity loss boundaries that define connectivity loss regions based on the connectivity data for each of a plurality of forward projected position vector path options from the SA location and/or velocity data of the mobile communication unit to determine the connectivity loss boundaries, and wherein displaying the geographical map area comprises displaying the connectivity loss regions for each of the plurality of forward projected position vector path options.

25. The mobile communication unit of claim 1, wherein the network is a cellular network, and wherein the propagation analyzer determines connectivity loss boundaries that define connectivity loss regions for the mobile communication unit relative to a plurality of cellular towers on the network based on the one or more forward projected position vector paths of the mobile communication unit and the connectivity data, and wherein the map renderer is configured to provide the map display data including the determined connectivity loss boundaries for the mobile communication unit relative to the plurality of cellular towers on the cellular network to the display.

26. The mobile communication unit of claim 11, wherein the network is a cellular network, and wherein the propagation analyzer determines connectivity loss boundaries that define connectivity loss regions for the mobile communication unit relative to a plurality of cellular towers on the network based on the one or more forward projected position vector paths of the mobile communication unit and the connectivity data, and wherein the map renderer is configured to provide the map display data including the determined connectivity loss boundaries for the mobile communication unit relative to the plurality of cellular towers on the cellular network to the display.

27. The method of claim 17, wherein executing the propagation algorithm comprises determining connectivity loss boundaries that define connectivity loss regions for the mobile communication unit relative to a plurality of cellular towers on an associated cellular network based on the connectivity data for each of a plurality of forward projected position vector path options from the SA location and/or velocity data of the mobile communication unit, and wherein displaying the geographical map area comprises displaying the determined connectivity loss boundaries for the mobile communication unit relative to the plurality of cellular towers on the cellular network.

* * * * *